(12) United States Patent
Rolfes et al.

(10) Patent No.: US 6,301,961 B1
(45) Date of Patent: Oct. 16, 2001

(54) INSULATED BEVERAGE CARAFE WITH VOLUME INDICATOR

(76) Inventors: Patrick J. Rolfes, 2006 Seadrift Dr., Corona Del Mar, CA (US) 92625; Douglas K. Blair, 331 Lytton Boulevard, Toronto, Ontario (CA), M5N 1R4; Paul E. Rolfes, 88 Ocean Vista, Newport Beach, CA (US) 92660; Jack B. Lovley, 21886 Michigan La., Lake Forest, CA (US) 92630

( * ) Notice: Subject to any disclaimer, the term of this patent is extended or adjusted under 35 U.S.C. 154(b) by 0 days.

(21) Appl. No.: 09/385,232

(22) Filed: Aug. 26, 1999

(51) Int. Cl.[7] ............................ G01F 23/02; A47J 41/00
(52) U.S. Cl. ........................ 73/328; 73/323; 99/283.3; 99/285; 99/279; 222/158; 220/592.22; 220/592.26; 220/592.27; 220/592.2; 220/663; 220/756
(58) Field of Search ..................................... 426/433, 115; 99/290, 285, 323, 279; 220/592.16, 592.17, 592.18, 592.2, 592.22, 592.26, 592.27, 592.28, 663, 756; 222/156, 157, 158, 465.1, 475.1, 155; 215/12.1, 398, 13.1; 73/323, 328, 426

(56) References Cited

U.S. PATENT DOCUMENTS

| | | | |
|---|---|---|---|
| 745,744 | 12/1903 | Uhalt | 73/325 |
| 1,621,252 | * 3/1927 | Hillyard | 222/463 |
| 2,533,578 | 12/1950 | Gomersail | 220/663 |
| 3,049,922 | 8/1962 | Schwanske | 73/323 |
| 3,217,923 | 11/1965 | Price | 220/663 |
| 3,336,856 | 8/1967 | Martin | 99/288 |
| 3,716,169 | 2/1973 | Chivers | 222/157 |
| 3,807,594 | * 4/1974 | Zimmermann et al. | 215/100 |
| 4,427,123 | 1/1984 | Komeda et al. | 215/13 R |
| 4,638,928 | 1/1987 | Webster | 222/155 |
| 4,718,566 | * 1/1988 | Wunder | 215/13.1 |
| 5,063,836 | * 11/1991 | Patel | 99/281 |
| 5,168,793 | * 12/1992 | Padamsee | 99/279 |
| 5,649,471 | 7/1997 | Heynderickx | 99/285 |
| 5,653,362 | 8/1997 | Patel | 222/156 |

FOREIGN PATENT DOCUMENTS

3806696-A1    9/1989   (DE) .................................... 220/663

* cited by examiner

Primary Examiner—Milton I. Cano
Assistant Examiner—Robert Madsen
(74) Attorney, Agent, or Firm—Gordon K. Anderson; Manfred E. Wolff

(57) ABSTRACT

The present invention is directed to an insulated beverage carafe adapted for use in an automatic drip coffee maker fabricated from non-reactive metal, having a heat resistant plastic handle that includes a detachable substantially transparent tubular gauge adapted to measure the amount of beverage within the carafe. Also taught is a method for preparing and serving hot coffee suitable in beverage service in individually dispensed portions, reading the gauge to determine when the carafe is empty; and, cleaning the empty carafe in a commercial dishwasher. An article of manufacture comprising packaging material containing an insulated beverage carafe with a handle that includes a gauge adapted to measure the amount of beverage within the carafe is also taught. The packaging material includes a brochure that provides directions for the use of said carafe.

8 Claims, 2 Drawing Sheets

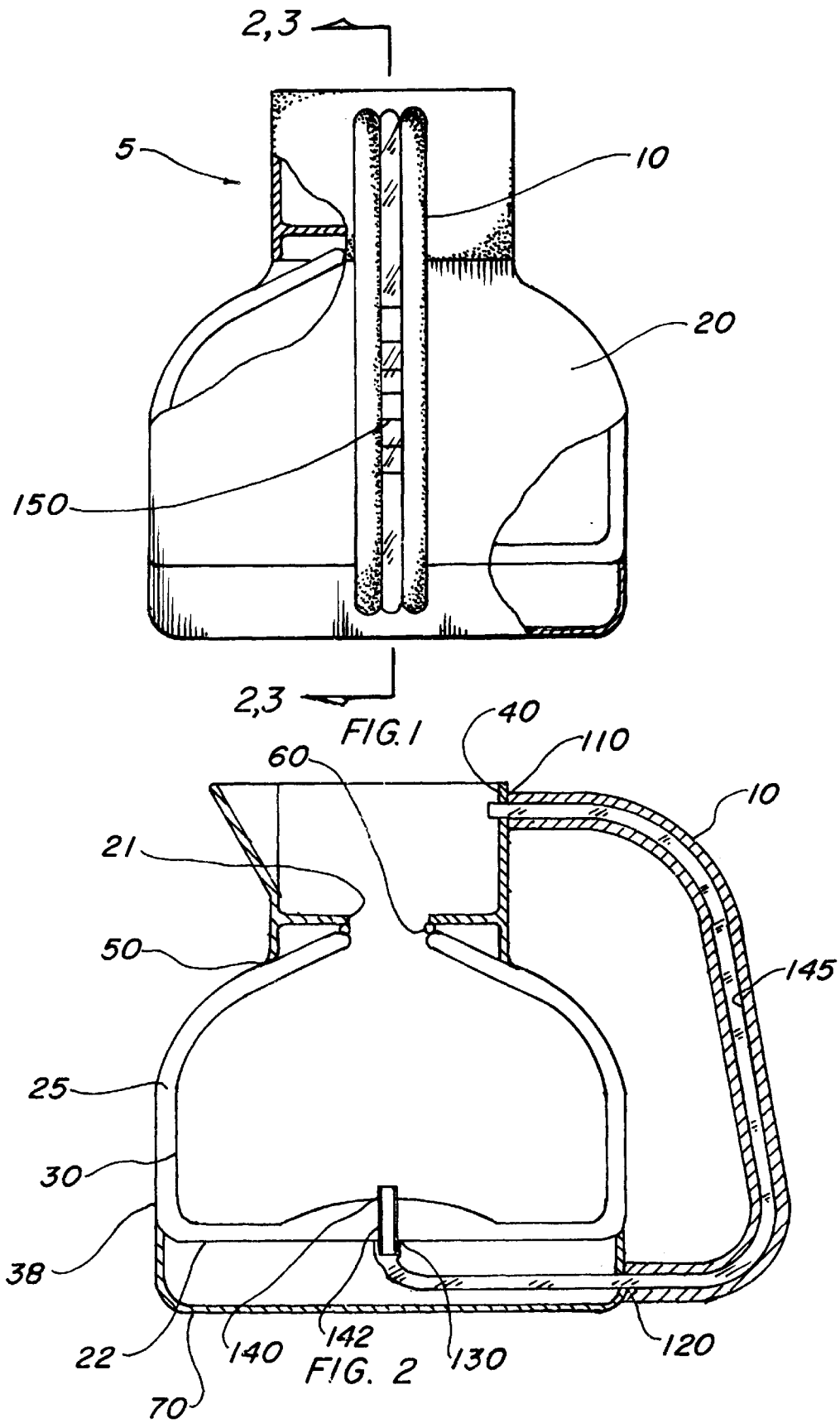

INSULATED BEVERAGE CARAFE WITH VOLUME INDICATOR

BACKGROUND ART

This invention relates generally to a beverage carafe, and more specifically to a hot beverage carafe substantially formed of metal, incorporating integral structure for enhancing the heat retention of a contained warm beverage, and providing a readily viewable volume indicator for ascertaining the volume of the contained beverage.

Hot beverages have traditionally been served during meals and as offerings of hospitality in many cultures. The use of tea has particularly ancient roots, and was known in China as early as 2700 BC. Coffee, a more recent innovation, was introduced into European cultures during the 16$^{th}$ and 17$^{th}$ centuries. The first coffeehouse was established in London in 1652, and coffeehouses were popular in New York, Philadelphia and Boston in the late 1600's.

Today, coffee drinking is extremely popular in Europe and the Western Hemisphere. Many coffeehouse facilities exist and are heavily patronized. Patrons have particular desire for specialized coffees including regional varieties such as Guatemalan coffee, African coffee, and Colombian coffee. In addition, decaffeinated coffee as well as flavored coffees are in great demand. Coffee drinkers are especially fastidious with respect to the coffee flavor. The cleanliness of the coffee preparation equipment, and especially the carafe, is of enormous importance in ensuring the finest flavor of the coffee. Thus, the availability of coffee carafes that preserve the special flavor characteristics of fine coffee are of great interest and value to beverage service establishments.

Unlike tea, which is almost always freshly prepared in small amounts, coffee is often brewed in larger amounts and kept in a pot or carafe for dispensing in individual beverage portions. This is particularly important in the beverage service trade, the restaurant trade, in hotel beverage service for large meetings, and for workplace beverage service. The requirement to store the brewed coffee for some period of time and to keep it at a hot temperature has given rise to a number of difficult problems brought about by the delicate nature of the constituents of brewed coffee. Because the quality of hot brewed coffee is rapidly degraded by reactive materials such as aluminum metal, prior art carafes have often been constructed of glass, which gives rise to well known breakage problems. Nonreactive metals, such as stainless steel, have ameliorated this difficulty but have created a new problem—the difficulty of estimating the beverage content of the carafe due to the opaque nature of the metal. Various gauge means have been used to estimate the beverage content of such carafes, but these have usually been breakable, difficult to clean, or difficult to read. Clearly, this was the genesis of what has become a long-standing problem.

The problem of reading gauges to determine the coffee content of a carafe is worthy of further explanation. As is well known, many restaurants and beverage service areas are only dimly lighted in order to provide an agreeably informal atmosphere for the diners. For this reason, it is often difficult to read gauges of coffee carafes in restaurant service, and special attention has to be paid to solving this problem. Normally, a restaurant serving person will carry a carafe of coffee as he or she makes the rounds of his or her patrons. Under these circumstances, it is essential that the volume of beverage in the carafe be readily determined, often in dim light, so that the serving person is aware of whether coffee is available for particular diners. Likewise, as the servers may be relatively untrained individuals who are working under intense pressure, the gauges must be easy to read. Prior art gauges do not adequately address these requirements, nor is their design even reflective of the fundamental nature of the underlying problem.

A further important requirement of these carafes is that they should be easy to clean. In the restaurant trade, a hygiene standard called the NSF (National Sanitation Foundation) standard is required of certain food equipment. The ease of cleaning the equipment is a crucial factor in attaining this standard. In addition, failure to remove all coffee residues from all parts of the carafe, including the indicator gauge, is crucial to the preservation of fine coffee flavor.

Prior art carafes with gauges are difficult, if not impossible, to clean properly. This may be so because of various bends and kinks in the plumbing of the gauge, whereby it is impossible either to clean the equipment properly in a dishwasher, and difficult to clean the equipment even manually. Thus, the availability of the carafe of this invention, which is advantageously "dishwasher-safe", as defined herein and thus readily cleaned without damage in a commercial dishwasher, is an important advance in the beverage carafe art. Moreover, the easy replacement of the gauge with a new tube likewise is an important advance in the beverage carafe art.

Still another problem created by storing brewed coffee in a carafe is the need to keep the beverage hot. Hot plates or similar heating devices have been used to accomplish this. The closeness of the vessel means to the heating element generally causes irregular heating of the brewed coffee, sometimes elevating the temperature of the beverage up to approximately its boiling point. Through such heating the coffee sometimes has the tendency to take on a scalded flavor, and, in addition, such overheating has a tendency to cause excessive moisture release, and evaporation, leading towards a change in the temperature of the reservoired coffee. The coffee may become excessively hot-around 190° F. (88° C.) This has lead to the scalding of restaurant patrons and resulting expensive lawsuits with large judgments for damages that have been widely reported in the press.

Yet still a further problem that exists with prior art carafes that have attempted to address some of these problems is the great variation in their size. As is well known, a standard type of beverage decanter is the coffee vessel such as is shown in the Martin U.S. Pat. No. 3,336,856. This vessel comprises a borosilicate glass vessel having a conventional balloon shape with a pour spout formed at its upper edge. Such a decanter is placed upon a brewing device that includes a hot plate, as also shown in said Martin patent, and remains there during coffee brewing, or to assure warming after a brewing cycle has been completed. In the beverage service trade, brewing devices made to fit this simple glass carafe are in widespread use—one very popular decanter of this type is made by the Bunn Corporation, Springfield, Ill. It is highly desirable that an improved carafe to address the problems already listed should be able to fit this type of brewer, in order to avoid the expense of replacing existing hardware and equipment.

Although it is clear that an urgent need exists for an improved carafe to meet these difficulties, simple means to do this have not been forthcoming. By way of background, attention is called to prior art methods and devices that have attempted to solve these problems in the past. U.S. Pat. No. 745,744 to Uhalt and U.S. Pat. No. 3,049,922 to Schwanske disclose coffeepot indicators in the handle of the coffeepot.

U.S. Pat. No. 3,217,923 to Price discloses an electric coffee maker having a brew level indicator window disposed in the sidewall of the vessel. The level indicator comprises a polycarbonate plastic material, for example, and is light transparent so that a view as seen from the outside the level of the liquid within the vessel. The level indicator is fitted into a longitudinal aperture that is cut into the side of the vessel. U.S. Pat. No. 3,716,169 to Chivers discloses a liquid level window for coffee makers. The invention provides a handle and liquid level window assembly for a coffee maker characterized by a transparent or translucent molded plastic window overlapping an elongated aperture in the coffeemaker and secured in proper sealing relationship by the coffeemaker handle and its associated mounting means. U.S. Pat. No. 5,653,362 to Patel is a beverage server having a viewing window. More specifically, there can be a level gauge housing projecting forwardly of the body. The gauge has a window which has graduations marked thereon so that the beverage level in the beverage server can be visually determined. U.S. Pat. No. 2,533,578 to Gomersall discloses a water level indicator in the wall of the pot or maker. U.S. Pat. No. 4,638,928 to Webster discloses a hot beverage container having a sight gauge along the side of the container. U.S. Pat. No. 5,649,471 to Heynderickx et al. discloses a container having visual sight means on the side.

In most of the embodiments shown, the carafes are integrally structured into the brewing apparatus itself, and are used primarily for the brewing of the beverage initially, rather than functioning as a vessel for containment of the beverage after it has been brewed, and to be sustained in its warmth for eventual consumption. None of the prior devices provides the combination of all the important features of a carafe for the beverage service trade which are to provide a coffee carafe having an improved sight gauge situated in its handle whereby the gauge is easily read in dim light by unskilled personnel for quick viewing of the coffee level, to provide a coffee carafe having an improved sight gauge that is readily cleaned in a commercial dishwasher in order to assure the flavor of each batch of coffee, to provide a coffee carafe having an improved sight gauge wherein the gauge is readily disconnected from the carafe for replacement, to provide a coffee carafe having an improved sight gauge wherein the carafe is dishwasher safe and food safe, to provide a coffee carafe having a height less than about 6.75 inches (17.1 cm.) and a base diameter of about 6.5 inches (16.5 cm.) to fit into a standard coffee brewer, for example a BUNN-O-MATIC® brewer made by the Bunn Corporation, Springfield, Ill., said carafe having an improved sight gauge, to provide a coffee carafe having an improved sight gauge capable of maintaining its contents between about 170° F. (77° C.) and about 190° F. (86° C.) for at least 3 hours while in use, wherein the carafe does not require external heating of the brewed contents, eliminating the over-cooking of the contained beverage, which normally tends to ruin the beverage's taste and, to provide a coffee carafe having an improved sight gauge wherein the carafe will not break if placed on an operating hot plate surface, for example in a BUNN-O-MATIC® brewer made by the Bunn Corporation, Springfield, Ill.

In contradistinction, the present invention embraces and finally addresses the clear need for an insulated beverage carafe with volume indicator at appropriate cost and ROI values. Thus, as pioneers and innovators attempt to make beverage carafe devices cheaper, more universally used, and of higher quality, none has approached same in combination with simplicity and reliability of operation, until the teachings of the present invention. It is respectfully submitted that other references merely define the state of the art or show the type of systems which have been used to alternately address those issues ameliorated by the teachings of the present invention. Accordingly, further discussions of these references has been omitted at this time due to the fact that they are readily distinguishable from the instant teachings to one of skill in the art.

OBJECTS AND SUMMARY OF THE INVENTION

Accordingly, several objects of the present invention are:

a) to provide a coffee carafe having an improved sight gauge situated in its handle whereby the gauge is easily read in dim light by unskilled personnel for quick viewing of the coffee level.

b) to provide a coffee carafe having an improved sight gauge that is readily cleaned in a commercial dishwasher in order to assure the uncontaminated flavor of each batch that is brewed.

c) to provide a coffee carafe having an improved sight gauge that is readily detached and replaced when necessary.

d) to provide a coffee carafe having an improved sight gauge wherein the carafe is dishwasher safe and food safe.

e) to provide a coffee carafe having an improved sight gauge, wherein the carafe is fabricated essentially from metal, thereby minimizing the chances for breakage, such as frequently occurs for the glass style of carafes normally used in beverage brewers.

f) to provide a coffee carafe with a capacity of about 64-fl. oz. (1890 ml.) having an improved sight gauge.

g) in one example, to provide a coffee carafe having a height less than about 6.75 inches (17.1 cm.) to fit into a standard coffee brewer, for example a BUNN-O-MATIC® brewer made by the Bunn Corporation, Springfield, Ill., said carafe having an improved sight gauge.

h) in another example, to provide a coffee carafe having a base diameter of about 6.5 inches (16.5 cm.) to fit into a standard coffee brewer for example a BUNN-O-MATIC® brewer made by the Bunn Corporation, Springfield, Ill., said carafe having an improved sight gauge.

i) in another example, to provide a coffee carafe having an improved sight gauge capable of maintaining its contents between about 170° F. (77° C.) and about 190° F. (86° C.) for at least 3 hours while in use.

j) in another example, to provide a coffee carafe having an improved sight gauge capable of maintaining its contents between about 170° F. (77° C.) and about 190° F. (86° C.) for at least 1 hour while in use.

k) to provide a coffee carafe having an improved sight gauge wherein the carafe does not require external heating of the brewed contents, eliminating the over-cooking of the contained beverage, which normally tends to ruin the beverage's taste.

l) in another example, to provide a coffee carafe having an improved sight gauge wherein the carafe will not break if placed on an operating means for heating surface, for example in a BUNN-O-MATIC® brewer made by the Bunn Corporation, Springfield, Ill.

m) to provide a coffee carafe having an improved sight gauge that is readily portable for transport to individual beverage consumers.

n) to provide a coffee carafe having an improved sight gauge wherein the exterior surface is not hot to the touch when containing a hot liquid, whereby personnel using the carafe are protected from accidental burns.

o) to provide a coffee carafe having an improved sight gauge that provides energy savings because it is not necessary to provide a source of heat to keep its contents at serving temperature.

These and other objects are accomplished by the parts, constructions, arrangements, combinations and subcombinations comprising the present invention, the nature of which is set forth in the following general statement, and preferred embodiments of which—illustrative of the best modes in which applicant has contemplated applying the principles—are set forth in the following description and illustrated in the accompanying drawings, and are particularly and distinctly pointed out and set forth in the appended claims forming a part hereof.

The present invention provides an insulated beverage carafe adapted for use in an automatic drip coffee maker, comprising a double walled substantially one-piece vessel having an interior volume adapted to hold a beverage, fabricated from non-reactive metal, for example stainless steel, tin, or titanium, or an alloy or metal plate of these metals. In one embodiment, the space enclosed by the double walls is sealed and evacuated. In another embodiment, the space enclosed by the double walls is filled with a insulation means for maintaining temperature, for example foamed plastic, fiberglass, and other insulation materials known to artisans for preventing heat transfer and maintaining temperature. The vessel has a substantially flat bottom and a substantially cylindrical body connected to a substantially bell-shaped shoulder and open neck portion. The open neck portion is connected to a heat resistant plastic spout attachment in a liquid-tight manner permitting a liquid to flowably enter or exit the interior volume of the vessel. The spout attachment includes at least one channel or the like conduit means connecting the interior volume with the exterior environment. The carafe has a heat resistant, plastic handle affixed at one end to the spout attachment and affixed to the vessel body at the other. The handle includes a substantially transparent tubular gauge or sandwiched aperture adapted to measure the amount of beverage within the carafe.

According to a feature of the present invention there is provided a carafe having one end of the handle affixed to a band fixedly encircling the vessel body near its bottom.

According to a further feature of the present invention there is provided a carafe having a substantially transparent, substantially tubular sight gauge having one end affixed to its spout attachment in a detachable but fluid tight manner permitting communication of the interior of the gauge with the atmosphere above the beverage; and, the other end of the gauge affixed in a detachable but fluid tight manner to the vessel so as to be in flowable communication with the beverage.

According to still a further feature of the present invention there is provided a carafe wherein an end of the gauge is affixed in a detachable but fluid tight manner to a connecting pipe section in communication with the beverage wherein the connecting pipe section passing through the space enclosed by the double walls forms a gas-tight seal with the double walls.

According to still a further feature of the present invention there is provided a carafe with a gauge for determining the volume of beverage within the carafe, wherein the gauge may be readily disconnected from the carafe for replacement.

According to a yet still a further feature of the present invention there is provided a carafe having a lid for opening and closing each of the at least one channel means.

According to a even still a further feature of the present invention there is provided an article of manufacture comprising packaging material containing an insulated beverage carafe adapted for use in an automatic drip coffee maker, comprising a double walled substantially one-piece vessel having an interior volume adapted to hold a beverage, fabricated from non-reactive metal, for example stainless steel, tin, or titanium, or an alloy or metal plate of these metals. The space enclosed by the double walls is sealed and evacuated, or alternatively filled with an insulation means for preventing heat transfer and maintaining temperature. The vessel has a substantially flat bottom and a substantially cylindrical body connected to a substantially bell-shaped shoulder and open neck portion. The open neck portion is connected to a spout attachment in a liquid-tight manner permitting a liquid to flowably enter or exit the interior volume of the vessel. The spout attachment includes at least one channel or the like conduit means connecting the interior volume with the exterior environment. The carafe has a handle affixed at one end to the spout attachment and affixed to the vessel body at the other. The handle includes a gauge adapted to measure the amount of beverage within the carafe. The packaging material includes a brochure that provides directions for the use of said carafe.

According to a yet even still a further feature of the present invention there is provided a method for preparing and serving hot coffee suitable in beverage service in individually dispensed portions comprising the steps of energizing the water heater of a commercial coffee brewer; arranging a filter and a predetermined amount of ground coffee within the filter in a filter basket installed in the brewer, passing a predetermined amount of heated water from the water heater sequentially through the ground coffee and filter to fill with coffee an insulated beverage carafe with volume indicator, removing the filled carafe from the brewer; carrying the filled carafe to beverage service patrons, filling individual cups with coffee, reading gauge to determine when the carafe is empty; and, cleaning and drying the empty carafe in a commercial dishwasher.

In sum, the above and other objects, features and objectives of the present invention, shall become apparent with the following description whether in conjunction with the accompanying drawings, in which like reference numerical designating indicators designate the same elements.

BRIEF EXPLANATION OF THE DRAWINGS

FIG. 1 is a front elevation view of the insulated beverage carafe with volume indicator according to the present invention.

FIG. 2 is a sectional view taken along lines 2—2 of FIG. 1 of an embodiment of the carafe illustrated in FIG. 1.

DETAILED DESCRIPTION OF THE PREFERRED EMBODIMENTS

Definitions

Figure 3:
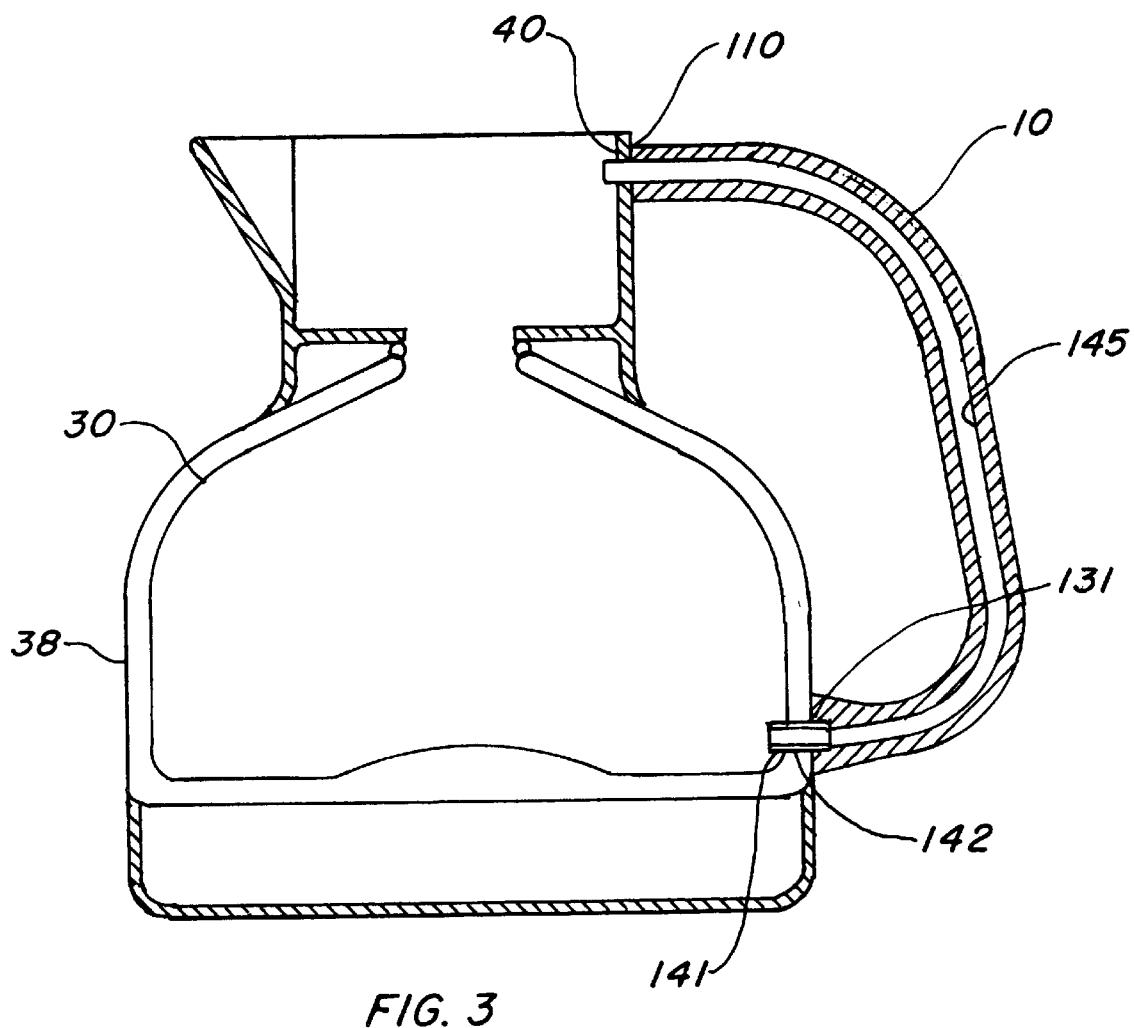
FIG. 3 is a sectional view taken along lines 3—3 of FIG. 1 of an alternate embodiment of the carafe illustrated in FIG. 1.

Unless defined otherwise, all technical and scientific terms used herein have the same meaning as is commonly understood by one of skill in the art to which this invention belongs. All patents and publications referred to herein are expressly incorporated by reference.

As used herein, by "insulated" it is meant that the carafe is designed to minimize heat loss by incorporating a double walled substantially one-piece vessel means fabricated from non-reactive metal. In one embodiment, the space enclosed by said double walls is sealed and evacuated, so that hot beverages held therein remain hot for an extended period of time without requiring an external heating source. In another embodiment which is made more cheaply and easily, the space enclosed by said double walls is sealed and filled with insulation means for preventing heat transfer and maintaining temperature, so that hot beverages held therein remain hot for an extended period of time without requiring an external heating source. Similarly, as used herein, by "insulated" it is meant that the carafe is designed to minimize heat gain by incorporating a double walled substantially one-piece vessel means fabricated from non-reactive metal. In one embodiment, the space enclosed by said double walls is sealed and evacuated, so that cold beverages held therein remain cold for an extended period of time without requiring an external cooling source. In another embodiment which is made more cheaply and easily, the space enclosed by said double walls is sealed and filled with insulation means for preventing heat transfer and maintaining temperature, so that cold beverages held therein remain cold for an extended period of time without requiring an external cooling source. As used herein, "beverage" is any liquid suitable for human consumption. As used herein, the terms "carafe", "server", "pot", "urn" and "pitcher" all refer to similar vessels used to serve beverages.

As used herein, "non-reactive metal" is any metal or alloy suitable for food preparation without changing the color or taste of the food. Examples of nonreactive metals include stainless steel, titanium, and tin.

As used herein, the term "detachable" as applied to the gauge of the invention means that the gauge is readily detached from the carafe of the invention by an ordinary beverage service employee without special training, and that a replacement gauge can be readily reattached by an ordinary beverage service employee without special training to reconstitute a fully functional carafe with a gauge.

Referring now to FIGS. 1 and 2, an insulated beverage carafe with volume indicator according to the present invention is shown and is generally indicated by reference number 5. Carafe 5 includes a double walled substantially onepiece vessel means 20 fabricated from non-reactive metal having an upper opening 21, and a bottom 22. Double walled vessel means 20 includes a space 25 enclosed by an inside wall member 30 and an outside wall member 38 of said double wall wherein space 25 is sealed and evacuated, or alternatively is filled with insulation means for maintaining temperature. A neck means 40 is affixed to opening 21 at a first circular attachment location 50 near the top of the exterior surface of outside wall member 38, and a second circular attachment location that includes an O-ring seal 60. A base 70 is circularly attached to the outside bottom of vessel means 20 near the juncture of inside wall member 30 and outside wall member 38.

Figure 4:
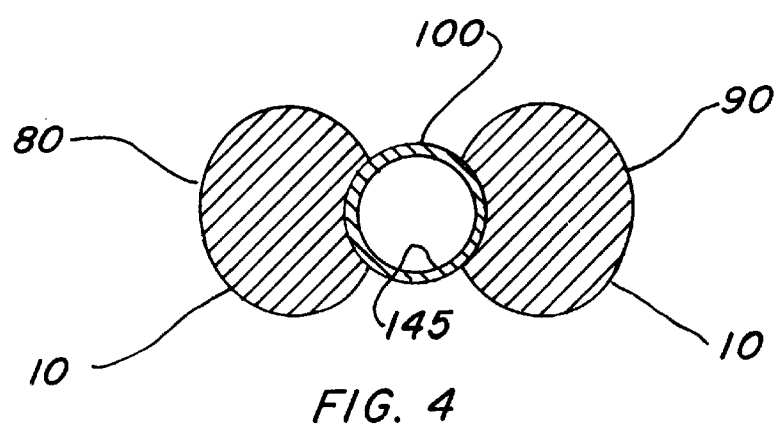
FIG. 4 is a sectional view of the handle of the insulated beverage carafe with volume indicator according to the present invention.

FIG. 4 is a sectional view of a handle means 10. Handle means 10 is formed from a first rod 80 and a second rod 90 fabricated from a material that does not conduct heat readily, wherein rod 80 and rod 90 are fixedly disposed laterally, in combination, alone side a substantially transparent tube means 100 in a contiguous manner positioning the tube means therebetween.

Referring to FIGS. 1 and 2, a first end of handle means 10 is attached near the top of neck means 40 at position 110, wherein a first end of rod 80 and a first end of rod 90 are fixedly secured to neck means 40. A second end of handle means 10 is attached near the bottom of base 70 at position 120, wherein a second end of rod 80 and a second end of rod 90 are fixedly secured to base 70. A first end of tube means 100 passes through neck means 40 in a detachable, but liquid-tight manner so as to be in gaseous communication with the atmosphere above the liquid contents of vessel means 20. A second end of tube means 100 passes first through base 70 and then in a detachable but liquid-tight manner through outside wall member 38 at location 130 and inside wall member 30 at location 140 of bottom 22 so as to be in liquid communication through the tubular lumen 145 with the liquid contents of vessel means 20. A means for calibrating 150 calibrates tube means 100 to enable measurement of the liquid content of vessel means 20.

It should be noted that a connecting pipe section 142 penetrates both the outside wall member 38 and inside wall member 30 in a sealed manner, as illustrated in FIGS. 2 and 3, for interfacing with the second end of the tube means 100, as described above. Referring to FIG. 3, an alternate embodiment of the invention is shown in which a second end of tube means 100 passes in a detachable but liquid-tight manner through outside wall member 38 at location 131 and inside wall member 30 at location 141 so as to be in liquid communication through the tubular lumen 145 with the liquid contents of vessel means 20.

The operation of carafe 5 will now be described. When it is desired to fill vessel means 20 with a beverage such as hot coffee, carafe 5 is placed directly below the filter basket of a coffee-making machine used to brew the coffee. The coffee-making machine may be of any suitable type, but a particular advantage of the carafe of the invention is that it is advantageously constructed to provide a coffee carafe having a height less than about 6.75 inches (17.1 cm.) and a base diameter of about 6.5 inches (16.1 cm.) to fit under most brewing baskets, including those designed for non-insulated glass bowl carafes such as a standard coffee brewer commonly known as a BUNN-O-MATIC® brewer made by the Bunn Corporation, Springfield, Ill. Unlike the server described in U.S. Pat. No. 5,653,362, the coffee-making machine may be of the hot burner type, but the burner is preferably switched off.

In the brewer, hot water passes through the ground coffee in the filter basket, and exits the basket by passing through the filter. The brewed coffee then drips, through neck 40 and opening 21 into vessel 20. As vessel 20 is filled, coffee passes into tube 100, whereby the volume of coffee contained in vessel 20 may be readily ascertained by reference to means for calibrating said tube for determining beverage level within said vessel 150. The dark coffee liquid readily contrasts with the substantially transparent tube 100, even in the relatively dim light encountered in many beverage service environments, and forms a sharp, easily read meniscus owing to the location of tube 20 on handle 10. When a desired amount of coffee (advantageously 64 oz. (1892 ml.)) has filled vessel 20, the serving person grasps handle 10 and carries carafe 5 to a desired location where the coffee is delivered to a cup or other receptacle by tilting carafe 5, whereupon coffee is delivered through a conventional spout attached to neck 40. The volume of coffee remaining in vessel 20 may be readily ascertained by frequent reference to means for calibrating said tube for determining beverage level within said vessel 150. It is not necessary to reheat the carafe at any time as, in one embodiment, the carafe is capable of maintaining its contents between about 170° F. (77° C.) and about 190° F. (86° C.) for at least 3 hours while in use and does not require external heating of the brewed contents, eliminating the over-cooking of the contained beverage, which normally tends to ruin the beverage's taste. In another embodiment which is made more cheaply and easily, wherein the carafe is insulated with insulation means for maintaining temperature, the carafe is capable of maintaining its contents between about 170° F. (77° C.) and about 190° F. (86° C.) for at least 1 hour while in use and does not require external heating of the brewed contents, eliminating the over-cooking of the contained beverage, which normally tends to ruin the beverage's taste.

When it is desired to clean carafe 5, the entire assembly is readily cleaned to remove all beverage residues in a commercial dishwasher, without damage to any of its component parts. When it is desired to replace tube 100, as for example after extended use, it is readily detached from its detachable attachment points and replaced with a replacement tube. Likewise, if the carafe is to be cleaned manually, it is readily washed using ordinary dishwashing methods familiar to unskilled personnel to produce a thoroughly clean carafe, owing to the absence of kinks and bends in the gauge assembly.

Those skilled in the art will readily understand that the methods and materials which are conventionally and simply illustrated herein may be exchanged for the like means, and artisans will know how to practice the instant teachings from the description herein. On this basis, the instant invention should be recognized as constituting progress in science and the useful arts, as solving the problems in beverage service beverage delivery enumerated above. In the foregoing description, certain terms have been used for brevity, clearness and understanding, but no unnecessary limitation are to be implied therefrom beyond the requirements of the prior art, because such words are used for descriptive purposes herein and are intended to be broadly construed.

Having described preferred embodiments of the invention with reference to the accompanying drawings, it is to be understood that the invention is not limited to those precise embodiments, and that the various changes and modifications may be effected therein by one skilled in the art without departing from the scope or spirit of the invention as defined in the appended claims. For example, the product can have other shapes, or could make use of other metals and plastics. Thus, the scope of the invention should be determined by the appended claims and their legal equivalents, rather than by the examples given.

What is claimed is:

1. An insulated beverage carafe adapted for use in an automatic drip coffee maker, comprising:
    a) a double walled substantially one-piece vessel fabricated from non-reactive metal, said double walls forming a sealed space in a state selected from the group consisting of:
        the state of being evacuated, and
        the state of being filled with insulation for maintaining temperature;
    b) said vessel having an interior volume adapted to hold a beverage;
    c) said vessel having a substantially flat bottom and a substantially cylindrical body connected to a substantially bell-shaped shoulder and a open neck portion;
    d) said open neck portion having a spout permitting a liquid to flowably enter and exit said interior volume of said vessel;
    e) said open neck portion includes at least one conduit connecting said interior volume with the exterior environment;
    f) said carafe having a handle defined by a first rod including a first end and a second end, and a second rod including a first end and a second end fixedly disposed laterally in combination therewith;
    g) said handle first ends affixed to said open neck portion;
    h) said handle second ends affixed to said vessel body; and
    i) a gauge within said handle adapted to measure the amount of beverage within the carafe, wherein said gauge is readily detachable from said carafe for replacement and is defined as a substantially transparent tube having a first end and a second end, said first end of said gauge being affixed to said open neck portion in a fluid tight manner permitting communication of the interior of said gauge with the atmosphere above said beverage with said second end of said gauge affixed in a fluid tight manner to said vessel so as to be in flowable communication with said beverage further said gauge being disposed alongside and between said handle first rod and handle second rod permitting ease of reading level of liquid content within said carafe in dim light.

2. The carafe as recited in claim 1, wherein said space enclosed by said double walls is sealed and evacuated.

3. The carafe as recited in claim 1 wherein said space enclosed by said double walls is filled with insulation for maintaining temperature.

4. The carafe as recited in claim 1 wherein said non-reactive metal selected from the group consisting of stainless steel and titanium.

5. The carafe as recited in claim 1 wherein said open neck portion and said spout are constructed of heat resistant plastic.

6. The carafe as recited in claim 1 wherein said handle is constructed of heat resistant plastic that does not conduct heat readily and said rods disposed laterally in combination contiguously contact the gauge within the handle positioning the gauge therebetween.

7. The carafe as recited in claim 1 further comprising a connecting pipe section in communication with said beverage near said substantially flat bottom of said vessel, said connecting pipe section passing through said space enclose by said double walls and said pipe forming a gas-tight seal with said double walls, also said second end of said gauge affixed to said pipe in a fluid tight manner.

8. The carafe as recited in claim 1 further comprising a connecting pipe section in communication with said beverage through said substantially flat bottom of said vessel, said connecting pipe section passing through said space enclose by said double walls and said pipe forming a gas-tight seal with said double walls, also said second end of said gauge affixed to said pipe in a fluid tight manner.

* * * * *